United States Patent [19]
Tatsuki et al.

[11] Patent Number: 5,760,954
[45] Date of Patent: Jun. 2, 1998

[54] REFLECTIVE TYPE SCREEN FOR A POLARIZING PROJECTOR

[75] Inventors: Koji Tatsuki, Kawagoe; Takaaki Kato, Ina-machi; Hideo Takamoto, Chiba; Tetsujiro Omura, Ichikawa, all of Japan

[73] Assignees: Kimoto Co., Ltd.; Izumi-Cosmo Co., Ltd., both of Japan

[21] Appl. No.: 706,773

[22] Filed: Sep. 3, 1996

[30] Foreign Application Priority Data

Feb. 8, 1996 [JP] Japan .................. 8-022486

[51] Int. Cl.⁶ .................................................. G03B 21/56
[52] U.S. Cl. .................................... 359/452; 359/456
[58] Field of Search ........................ 359/443, 452, 359/456

[56] References Cited

U.S. PATENT DOCUMENTS

| | | | |
|---|---|---|---|
| 4,796,990 | 1/1989 | Crothers et al. | 352/89 |
| 5,148,309 | 9/1992 | Yamada et al. | 359/443 |
| 5,335,022 | 8/1994 | Braun et al. | 348/744 |
| 5,400,069 | 3/1995 | Braun et al. | 348/20 |

FOREIGN PATENT DOCUMENTS 6-75302   3/1994   Japan.

OTHER PUBLICATIONS

English Language Abstract.

*Primary Examiner*—Daniel P. Malley
*Attorney, Agent, or Firm*—Lorusso & Loud

[57] ABSTRACT

A reflective type screen has well-balanced properties and is capable of producing a clear image even in a lighted room. The screen has a reflective layer formed on a substrate, a polarizing film layer adhered to the reflective layer through an adhesive layer, and a light diffusion layer on the other side of the polarizing film layer. The reflective layer preferably consists of a coating layer including a binder resin and aluminum paste and having a glossiness in the range of from 70 to 120% as measured according to JIS-K-7105. The glossiness of the surface of the product, i.e. the screen, is in the range of from 3 to 9%. In the above range of glossiness, the screen exhibits an even luminance and a good SG value.

9 Claims, 1 Drawing Sheet

REFLECTIVE TYPE SCREEN FOR A POLARIZING PROJECTOR

BACKGROUND OF THE INVENTION

1. Field of the Invention

The present invention relates to a reflective type screen for a liquid crystal polarizing projector, more specifically, a reflective type screen capable of producing a clear image without uneven luminance in a lighted room.

2. The Related Art

A reflective type screen comprising a reflective layer which reflects light from a projector and a diffusion layer which diffuses the reflected light has been used as a screen for overhead projectors, slide projectors, motion-picture projectors and the like. A recently adopted reflective type screen using a polarizing film enables viewers to observe a high-contrast projected image in a lighted room (Japanese Patent Applns. Laid-open No. H4-301830, No. H4-301831 et al). The reflective layer of the conventional reflective type screen is formed, for example, by mirror-finishing aluminum deposited on a substrate. Further, a reflective type screen which uses a reflective layer comprising scale-like aluminum pigment and binder to reduce the reflection of external light in a lighted room has also been proposed (Japanese Patent Appln. Laid-open No. H6-75302).

The reflective type screen is required to have a good SG (Screen Gain) value, a large horizontal light amount ratio, i.e., no uneven luminance in the horizontal direction, a large peripheral light amount ratio, i.e., a small difference of light amount between the central and peripheral parts of the screen, and good optical contrast between the dark and bright portions of the projected image. However, it is difficult for the conventional reflective type screen to satisfy all of these requirements.

For example, a higher reflection rate of the reflective layer is desirable in order to obtain a high SG value, but when the reflective layer has a high reflectance, the contrast ratio between the bright and dark portions of the projected image is reduced. Especially when the reflective layer is subjected to a mirror-finishing process, it has a problem of "glare". On the other hand, when the light diffusion of the screen is enhanced by use of a diffusion layer to obtain a large light quantity ratio in the horizontal direction or at the periphery and to suppress "glare," the total quantity of light of the screen becomes insufficient for the viewer to easily observe the projected image and the image can not be observed at all in a lighted room.

SUMMARY OF THE INVENTION

Therefore, an object of the present invention is to provide a reflective type screen which has a well-balanced performance in the above-mentioned properties. Another object of the present invention is to provide a reflective type screen capable of producing a clear and high-contrast image without uneven luminance in a lighted room.

A reflective type screen for a polarizing projector according to the present invention comprises at least a reflective layer and a light diffusion layer, wherein the glossiness of the reflective layer is in the range of 70 to 120% as measured according to JIS-K-7105 and the glossiness of the surface of the screen is in the range of 3 to 9% according to the same standard.

In determination of glossiness in accordance with JIS-K7105 both (1) a primary standard surface (refractive index of 1.567) or a secondary standard surface, having a surface glossiness calibrated based on a primary standard surface, and (2) the sample surface are both impinged with light from a standard light source of known light flux at an angle 60±0.1°. The flux of the light reflected off of the surface at a light receiving angle of 60±0.1° detected for the sample is expressed as a percentage based on the light flux detected for the standard surface, with the amount of light flux reflected at 60±0.1° by a standard surface having a refractive index of 1.567 being expressed as 100%.

Within the above-defined range of glossiness of the reflective layer, the light amount ratio in the horizontal direction or at the periphery can be improved without lowering the SG value. As a result, a clear image having no uneven luminance can be obtained in a lighted room. A particular effect in the above-defined range of glossiness of the screen surface is that the directly reflected light from the source of the projector, the so-called hot spot, becomes unnoticeable and a practical image of high optical contrast can be obtained.

The SG value is the luminance ratio of the screen surface to the luminance of a perfect diffusing surface and is defined by $$SG = (B/E) \cdot \pi$$

where B is the luminance of the screen surface (cd/m$^2$=nit) and E is the illuminance (lm/m$^2$=lux).

According to another aspect of the present invention, a reflective type screen for a polarizing projector comprises a reflective layer, a polarizing film layer and a matte layer, which are formed on a substrate in this order, wherein the reflective layer consists of aluminum paste coated on the substrate. Alternatively, the reflective layer consists of aluminum deposited on a matte surface of the substrate. By structuring the reflective layer in these ways, glossiness in the above mentioned range can be obtained and the object of the present invention can therefore be achieved.

According to a preferred embodiment of the present invention, the reflective type screen for a polarizing projector comprises a reflective layer, an adhesion layer, a polarizing film layer and a matte layer, which are formed on a substrate in this order, wherein the reflective layer consists of aluminum paste coated on the substrate and the glossiness of the reflective layer is in the range of 70 to 120% as measured according to JIS-K-7105.

DESCRIPTION OF THE PREFERRED EMBODIMENT

The reflective type screen according to the present invention will be explained in detail hereinafter.

Figure 1:
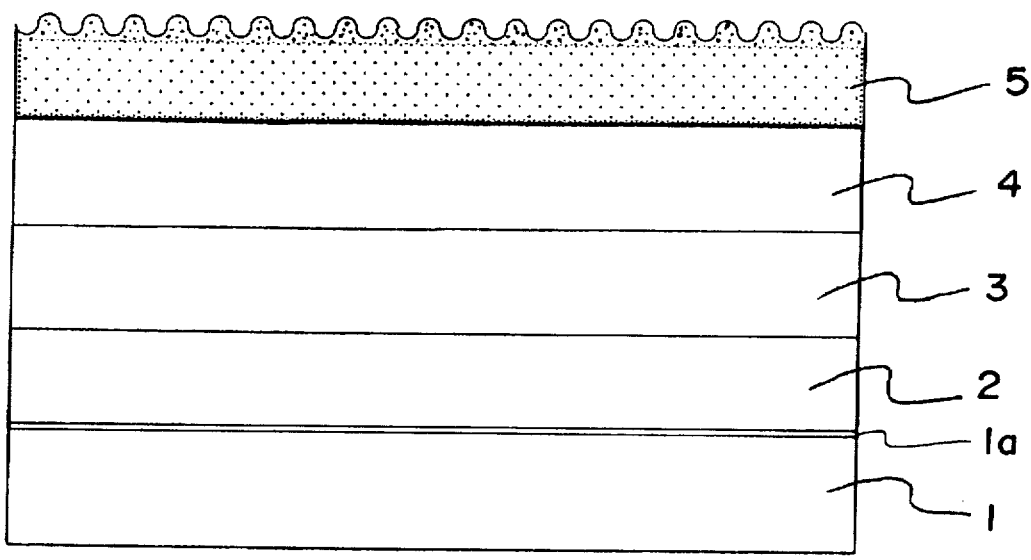
FIG. 1 is a sectional view of one embodiment of the reflective type screen of the present invention.

FIG. 1 shows an embodiment of the reflective type screen of the present invention, which comprises a substrate 1, a reflective layer 2 laminated on the substrate 1, a polarizing film 4 laminated on the reflective layer 2 through and interposed an adhesion layer 3 and a light diffusion layer 5 formed on the polarizing film 4.

The substrate 1 may be a of a resin sheet such as of polyethylene terephthalate, polyvinyl chloride or the like. When the reflective layer is formed by deposition of aluminium as explained hereinafter, the one surface where the reflective layer is to be formed should be a matte surface.

The reflective layer 2 is formed on the substrate 1 to have a glossiness in the range of 70 to 120%. In this range of glossiness, a good balance between the SG value and even luminance is obtained. Namely, when the glossiness is under 70%, the screen does not have a sufficient SG value. When the glossiness is over 120%, an optical contrast ratio sufficient to produce a clear image can not be obtained.

In a preferred structure for obtaining glossiness of the reflective layer in the above-mentioned range, the reflective layer 2 comprises aluminum paste and a binder resin. The reflective layer 2 is formed on the substrate by applying and drying a coating mixture consisting of aluminum paste, a binder resin and an appropriate solvent. As the binder resin, one or a mixture of two or more kinds of resins selected from among vinyl acetate resin, denatured vinyl acetate resin, denatured vinyl acetate/acrylic copolymer resin, ethylene/vinyl acetate resin, polyester resin, acrylic copolymer resin, acryl silicone resin, cellulose resin, vinyl chloride/vinyl acetate copolymer resin, styrene resin, urethane resin, epoxy resin, denatured polyvinyl alcohol resin, acrylonitrile rubber and others may be used. The amount of the aluminum paste added to the resin is from 10 to 40 parts relative to 100 parts of the resin, preferably from 20 to 30 parts. When the amount of the aluminum paste is too small, the specified glossiness can not be obtained, whereas too much aluminum impairs the adhesion between the coating and the substrate.

In an alternative structure of the reflective layer 2 for obtaining a glossiness in the above defined range, the reflective layer is formed by deposition of aluminium on a matted surface of the substrate. The surface of the substrate can be matted by a generally known matting process such as sand-blasting, chemical matting or the like. The surface roughness Ra (center line average roughness) of the matte surface is preferably in the range of 0.05 to 0.50 μm.

The polarizing film 4, which comprises a polarizer or a polarizing plate whose permeation axis extends in the same direction as the polarizing direction of the light from the polarizing projector, is not essential to the present invention. But by using the polarizing film 4, reflection of external light at the surface of the screen can be effectively suppressed. Further, the density of black parts of the image, that is parts where no light from the projector is projected, is enhanced since the polarizing film 4 is colored (generally dark gray) and then high-contrast image can be obtained in a light room. Accordingly, if the polarizing film 4 is not used, it is preferable to provide a colored layer to enhance optical contrast. The colored layer may be provided between the reflective layer 2 and a light diffusion layer 5. Otherwise, the light diffusion layer 5 itself may contain a black pigment or dye such as carbon black or the like.

The adhesion layer 3 is provided to laminate the polarizing film 4 (or the colored layer) to the reflective layer 2. So, the adhesion layer is not required when no polarizing film 4 is used or when the colored layer is directly formed on the reflective layer 2 by coating. The adhesion layer 3 can be formed of a transparent adhesive agent such as acrylic resin, urethane resin, polyester resin, silicone resin or the like.

The light diffusion layer 5, which is the outermost layer of the reflective type screen of the present invention, is provided to prevent the light reflected from the reflective layer 2 being unevenly distributed or concentrated at the central part of the screen, thereby ensuring the viewer can observe a clear image at the periphery of the screen. For this purpose, the glossiness of the screen provided with the light diffusion layer 5 is preferably in the range of from 3 to 9% by JIS-K-7105 and more preferably in the range of from 4 to 8%. When the glossiness of the screen is 9% or less, glare is suppressed and the hot-spot becomes unnoticeable. When the glossiness of the screen is 3% or more, sufficient optical contrast can be obtained whereas, when the glossiness is less than 3%, the screen becomes whitened as a whole and the optical contrast is lowered because of increased light diffusion.

As the light diffusion layer 5 there can be used a chemically or physically matted film consisting of acrylic resin, polyvinyl chloride, polyvinylidene chloride, polystyrene, polypropyrene, cellulose acetate, polyester, polycarbonate, polyethylene, polyvinyl alcohol or the like. Preferably, a chemical matte layer which comprises an inorganic pigment such as silica, calcium carbonate, barium phosphate or the like, or a resin pigment such as styrene resin, acrylic resin or the like added to the binder is used. Such a chemical matte layer can be easily formed by applying and drying the binder solution on the polarizing film 4 or the reflective layer 2. This process is advantageous compared with the process where the light diffusion layer is formed by lamination of a physically matted film.

The light diffusion layer 5 may include known additives such a UV absorber, an anti-static agent or the like in amounts that do not impair the diffusion function of the layer.

The process for manufacturing the reflective type screen of the foregoing structure is not particularly limited. For example, it can be produced by preparing a reflective layer 2 comprising aluminum paste on a substrate 1 of synthetic resin film by coating and drying, preparing a polarizing film 4 having a chemical matte layer or light diffusion layer 5 on one side and an adhesive layer 3 on the other side, and laminating the polarizing film 4 to the reflective layer 2 so that the adhesive

| Polyester resin | 20 parts by weight |
| --- | --- |
| (Vyron 300: Toyobo Co., Ltd.) | |
| Aluminum paste | 5 parts by weight |
| (771N: Showa Alumi-Powder) | |
| Ethyl acetate | 30 parts by weight |
| Butyl acetate | 30 parts by weight |

On the other hand, a coating solution for forming a chemical matte layer having the following composition was applied on one side of a polarizing film of a thickness of 60 μm (MT-NH60: Mitsui Toatsu Chemical) and dried to form a layer having a thickness of 3 μm. The glossiness of the chemical matte layer was found to be 15%.

| Polyester resin | 15 parts by weight |
| --- | --- |
| (Vyron 300: Toyobo Co., Ltd.) | |
| Silica pigment | 5 parts by weight |
| (SYLYSIA 730: Fuji Silysia Chemical Co., Ltd.) | |
| Ethyl acetate | 30 parts by weight |
| Butyl acetate | 30 parts by weight |

An adhesive layer of the following composition was applied to the other side of the polarizing film using a bar coater and dried.

| Acrylic resin | 100 parts by weight |
| --- | --- |
| (Rikidyne AR-2110: | |
| Sankyo Chemical Industries Co., Ltd.) | |
| Hardening agent | 10 parts by weight |

-continued

| (L-45: Soken Chemical Co., Ltd.) | |
|---|---|
| Ethyl acetate | 200 parts by weight |

The prepared polarizing film having the chemical matte layer on one side and the adhesive layer on the other side was laminated to the reflective layer formed on the substrate, through the adhesive layer, layer to obtain the reflective type screen. The glossiness of the surface of the screen was found to be 6%.

The SG value, optical contrast ratio and light amount ratio at the periphery and in the horizontal direction of the screen were measured. The SG value was calculated using the following equation:

$$SG = (B/E) \times \pi$$

where B is the luminance (cd/m$^2$=nit) of the screen and E is the illuminance (lm/m$^2$=lux) of the screen. The optical contrast ratio was found using the following formula:

[contrast]=[luminance of white image]/[luminance of black image]

Figure 2:
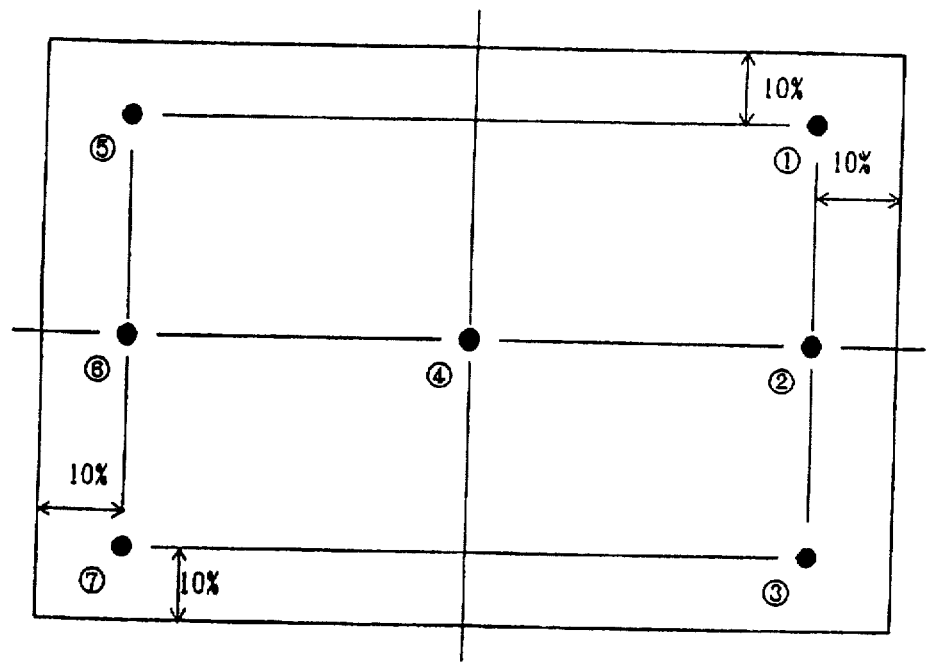
FIG. 2 is a diagram for explaining the method for measuring a horizontal light amount ratio.

The light amount ratio was obtained as shown in FIG. 2. The luminances of six points, each inward of the edge of a 60-inch wide screen by 10%, and one central point of the screen were measured. The light amount ratio in the horizontal direction was calculated using the formula:

$$[\{(B_2+B_6)/2\}/B_4] \times 100$$

and the peripheral light amount ratio was calculated using the formula:

$$[\{(B_1+B_3+B_5+B_7)/4\}/B_4] \times 100.$$

In these formulae, $B_1$–$B_7$ respectively represent the luminances at the points 1–7. The results are shown in Table 1.

TABLE 1

| | Glossiness | | | Light Amount Ratio | | |
|---|---|---|---|---|---|---|
| | A (*) (%) | B (**) (%) | SG value | Periphery (%) | Horizontal (%) | Contrast Ratio |
| Examp. 1 | 90 | 6 | 2.5 | 30 | 30 | 25 |
| Examp. 2 | 75 | 5 | 2.3 | 33 | 33 | 27 |
| Comp. Examp. | | | | | | |
| 1 | 200 | 15 | 3.5 | 10 | 10 | 10 |
| 2 | 60 | 3 | 1.0 | 60 | 60 | 30 |
| 3 | 150 | 10 | 3.0 | 15 | 15 | 15 |
| 4 | 90 | 11 | 3.2 | 12 | 12 | 12 |
| 5 | 90 | 2 | 0.8 | 70 | 70 | 35 |
| 6 | 150 | 7 | 3.0 | 18 | 18 | 17 |
| 7 | 60 | 5 | 1.8 | 15 | 15 | 24 |

\* A: glossiness of the reflective layer
\*\* B: glossiness of the product

Example 2

A white polyester film having a thickness of 100 μm and one sand-blasted surface was prepared. A reflective layer of 400 Å was formed on the sand-blasted surface of the film by deposition of aluminium. The glossiness of the reflective layer was found to be 75%.

A polarizing film provided with a transparent adhesive layer and a chemical matte layer in the same manner as in Example 1 was laminated on the substrate thus provided with the reflective layer via the adhesive layer to form a reflective type screen. The glossiness of the surface of the screen was found to be 5%. The reflective screen was measured for a SG value, optical contrast ratio and light amount ratio at the periphery and in the horizontal direction in the same manner as in Example 1. The results are shown in Table 1.

Comparative Example 1

A reflective layer of 400 Å was formed on a white polyester film having a thickness of 100 μm by deposition of aluminum. The glossiness of the reflective layer was found to be 200%.

A polarizing film provided with a transparent adhesion layer and a chemical matte layer in the same manner as in Example 1 was laminated on the substrate thus provided with the reflective layer via the adhesive layer to form a reflective type screen. The glossiness of the surface of the screen was found to be 15%. The reflective screen was measured for SG value, optical contrast ratio and light amount ratio at the periphery and in the horizontal direction in the same manner as in Example 1. The results are shown in Table 1.

Comparative Example 2

A coating solution for forming a reflective layer having the following composition was applied to one side of a polyester film having a thickness of 100 μm (LUMIRROR E-20: Toray Industries Inc.) using a bar coater and dried. The glossiness of the reflective layer was found to be 60%.

| Polyester resin | 20 parts by weight |
|---|---|
| (Vyron 300: Toyobo Co., Ltd.) | |
| Aluminum paste | 1 parts by weight |
| (771N: Showa Alumi-Powder) | |
| Ethyl acetate | 30 parts by weight |
| Butyl acetate | 30 parts by weight |

A polarizing film provided with a transparent adhesion layer and a chemical matte layer in the same manner as in Example 1 was laminated on the substrate thus provided with the reflective layer via the adhesive layer to form a reflective type screen. The glossiness of the surface of the screen was found to be 3%. The reflective screen was measured for SG value, optical contrast ratio and light amount ratio at the periphery and in the horizontal direction in the same manner as in Example 1. The results are shown in Table 1.

Comparative Example 3

A coating solution for forming a reflective layer having the following composition was applied to one side of a polyester film having a thickness of 100 μm (LUMIRROR E-20: Toray Industries Inc.) using a bar coater and dried. The glossiness of the reflective layer was found to be 150%.

| Polyester resin | 20 parts by weight |
|---|---|
| (Vyron 300: Toyobo Co., Ltd.) | |
| Aluminum paste | 10 parts by weight |
| (771N: Showa Alumi-Powder) | |
| Ethyl acetate | 30 parts by weight |
| Butyl acetate | 30 parts by weight |

A polarizing film provided with a transparent adhesion layer and a chemical matte layer in the same manner as in Example 1 was laminated on the substrate thus provided with the reflective layer via the adhesive layer to form a reflective type screen. The glossiness of the surface of the screen was found to be 10%. The reflective screen was measured for SG value, optical contrast ratio and light amount ratio at the periphery and in the horizontal direction in the same manner as in Example 1. The results are shown in Table 1.

Comparative Example 4

A reflective layer similar to that of Example 1 was formed on one side of a polyester film having a thickness of 100 µm (LUMIRROR E-20: Toray Industries Inc.).

On the other hand, a coating solution for forming a chemical matte layer having the following composition was applied to one side of a polarizing film of a thickness of 60 µm (MT-NH60: Mitsui Toatsu Chemical) using a bar coater and dried to form a layer having a thickness of 3 µm. The glossiness of the chemical matte layer was found to be 25%.

| Polyester resin | 15 parts by weight |
| --- | --- |
| (Vyron 300: Toyobo Co., Ltd.) | |
| Silica pigment | 2 parts by weight |
| (SYLYSIA 730: Fuji Silysia Chemical Co., Ltd.) | |
| Ethyl acetate | 30 parts by weight |
| Butyl acetate | 30 parts by weight |

An adhesive layer similar to that of Example 1 was formed on the other side of the polarizing film. A reflective type screen was produced by laminating the polarizing film thus prepared so that the adhesive layer thereof was laminated to the reflective layer formed on the substrate. The glossiness of the surface of the screen was found to be 11%. The reflective screen was measured for SG value, optical contrast ratio and light amount ratio at the periphery and in the horizontal direction in the same manner as in Example 1. The results are shown in Table 1.

Comparative Example 5

A reflective layer similar to that of Example 1 was formed on one side of a polyester film having a thickness of 100 µm (LUMIRROR E-20: Toray Industries Inc.).

On the other hand, a coating solution for forming a chemical matte layer having the following composition was applied to one side of a polarizing film of a thickness of 60 µm (MT-NH60: Mitsui Toatsu Chemical) using a bar coater and dried to form a layer having a thickness of 3 µm. The glossiness of the chemical matte layer was found to be 8%.

| Polyester resin | 15 parts by weight |
| --- | --- |
| (Vyron 300: Toyobo Co., Ltd.) | |
| Silica pigment | 10 parts by weight |
| (SYLYSIA 730: Fuji Silysia Chemical Co., Ltd.) | |
| Ethyl acetate | 30 parts by weight |
| Butyl acetate | 30 parts by weight |

An adhesive layer similar to that of Example 1 was formed on the other side of the polarizing film. A reflective type screen was produced by laminating the polarizing film thus prepared so that the adhesive layer thereof was laminated on the reflective layer formed on the substrate. The glossiness of the surface of the screen was found to be 2%. The reflective screen was measured for SG value, optical contrast ratio and light amount ratio at the periphery and in the horizontal direction in the same manner as in Example 1. The results are shown in Table 1.

Comparative Example 6

A reflective layer similar to that of Comparative Example 3 (glossiness of 150%) was formed on one side of a polyester film having a thickness of 100 µm (LUMIRROR E-20: Toray Industries Inc.).

On the other hand, a coating solution for forming a chemical matte layer having the following composition was applied to one side of a polarizing film of a thickness of 60 µm (MT-NH60: Mitsui Toatsu Chemical) using a bar coater and dried to form a layer having a thickness of 3 µm. The glossiness of the chemical matte layer was found to be 10%.

| Polyester resin | 15 parts by weight |
| --- | --- |
| (Vyron 300: Toyobo Co., Ltd.) | |
| Silica pigment | 7 parts by weight |
| (SYLYSIA 730: Fuji Silysia Chemical Co., Ltd.) | |
| Ethyl acetate | 30 parts by weight |
| Butyl acetate | 30 parts by weight |

An adhesive layer similar to that of Example 1 was formed on the other side of the polarizing film. A reflective type screen was produced by laminating the polarizing film thus prepared so that the adhesive layer thereof was laminated to the reflective layer formed on the substrate. The glossiness of the surface of the screen was found to be 7%. The reflective screen was measured for SG value, optical contrast ratio and light amount ratio at the periphery and in the horizontal direction in the same manner as in Example 1. The results are shown in Table 1.

Comparative Example 7

A reflective layer similar to that of Comparative Example 2 (a glossiness of 60%) was formed on one side of a polyester film having a thickness of 100 µm (LUMIRROR E-20: Toray Industries Inc.).

A polarizing film provided with a transparent adhesive layer and a chemical matte layer (glossiness of 15%) in the same manner as in Example 1 was laminated on the substrate thus provided with the reflective layer via the adhesive layer to form a reflective type screen. The glossiness of the surface of the screen was found be 5%. The reflective screen was measured for SG value, optical contrast ratio and light amount ratio at the periphery and in the horizontal direction in the same manner as in Example 1. The results are shown in Table 1.

As can be understood from the results shown in Table 1, the screens having a reflective layer whose glossiness was not less than 150% (Comparative Examples 1, 3 and 6) showed a good SG value but did not exhibit a sufficient contrast ratio. The screen prepared by deposition of aluminum on a flat surface of the film produced glare that made the image hard to watch. On the other hand, the screens having a reflective layer whose glossiness was not more than 60% (Comparative Examples 2 and 7) exhibited a high contrast ratio but a low SG value. This made the image dark and difficult to see in a light room. In addition, the screen having a high glossiness (Comparative Example 4) did not exhibit a sufficient contrast ratio notwithstanding that the glossiness of the reflective layer was 90% or more, while the screen having a low glossiness (Comparative Example 5) showed an extremely low SG value.

On the contrary, the reflective type screens of the Examples of the present invention showed good balance among SG value, lighted amount ratio at the periphery or in the horizontal direction and optical contrast ratio. A clean image was produced on these screens in a lighted room.

As is clear from the above explanation, the reflective type screen according to the present invention, which comprises a reflective layer and a light diffusion layer, has the well-balanced properties required of a reflective type screen since the glossinesses of both the reflective layer and the screen surface are adjusted to within appropriate ranges, thereby enabling a clean image to be produced thereon in a light room.

We claim:

1. A reflective type screen for a polarizing projector comprising, formed in order on a substrate, a reflective layer, a polarizing film layer and a light diffusion layer, wherein said substrate has a matte surface and the reflective layer is formed by deposition of aluminum on the matte surface.

2. The reflective type screen for a polarizing projector of claim 1, further comprising an adhesive layer interposed between the reflective layer and the polarizing film layer.

3. A reflective type screen for a polarizing projector comprising:

a reflective layer presenting a surface having a glossiness in the range of from 70 to 120%, based on a glossiness of 100% for a standard surface having a refractive index of 1.567 and as measured according to JIS-K7105;

a light diffusion layer superimposed on said reflective layer; and wherein the screen presents an exterior surface having glossiness in the range from 3 to 9% based on 100% for said standard surface.

4. The reflective type screen of claim 3 further comprising:

a substrate on which said reflective layer is formed; and a polarizing film layer interposed between said reflective layer and said light diffusion layer.

5. The reflective type screen of claim 3 wherein the reflective layer is formed of an aluminum paste.

6. The reflective type screen of claim 4 further comprising:

an adhesive layer interposed between and adhering together the reflective layer and the polarizing film layer.

7. The reflective type screen of claim 3 further comprising a substrate providing a matte surface on which said reflective layer is formed, said matte surface having a surface roughness Ra in the range of 0.05 to 0.50 μm.

8. The reflective type screen of claim 4 wherein said substrate presents a matte surface on which said reflective layer is formed, said matte surface having a surface roughness Ra in the range of 0.05 to 0.50 μm.

9. The reflective type screen for a polarizing projector of claim 1 wherein said matte surface has a surface roughness Ra in the range of 0.05 to 0.50 μm.

* * * * *

UNITED STATES PATENT AND TRADEMARK OFFICE
CERTIFICATE OF CORRECTION

PATENT NO. : 5,760,954
DATED : Koji Tatsuki, et. al.
INVENTOR(S) : June 2, 1998

It is certified that error appears in the above-identified patent and that said Letters Patent is hereby corrected as shown below:

```
    Title Page, item [75]    "Inventors", "Takaaki Kato, Ina-
machi" should read --Takaaki Kato, Saitama--.

Col. 7, line 31, delete "thereof"; and line 61, delete "thereof".
Col. 8, line 24, delete "thereof"; and line 65, "lighted" should read --light--.
```

Signed and Sealed this

Twenty-second Day of June, 1999

Attest:

Q. TODD DICKINSON

Attesting Officer

Acting Commissioner of Patents and Trademarks

UNITED STATES PATENT AND TRADEMARK OFFICE
CERTIFICATE OF CORRECTION

PATENT NO.    : 5,760,954
DATED         : June 2, 1998
INVENTOR(S)   : Koji Tatsuki et al It is certified that error appears in the above-identified patent and that said Letters Patent is hereby corrected as shown below:

Column 4,
After Line 35, insert the following:

Layer 3 is adjacent to the reflective layer 2. Here, the polarizing film 4 may be a colored film. The reflective type screen may be also produced by preparing a reflective layer 2 comprising aluminum past on a substrate 1 of synthetic resin by coating and drying, and applying a colored chemcial matte layer or light diffusion layer 5 onto the reflective layer 2 by coating

EXAMPLES

The present invention will be further explained by working examples. In the examples "glossiness' was measured according to JIS-K-7105, specifically by projecting a light from a standard light source onto a surface of the speciemen at an incident angle of 60 degree and measuring the amount of regularly reflected light with a light receiving device.

UNITED STATES PATENT AND TRADEMARK OFFICE
CERTIFICATE OF CORRECTION

PATENT NO. : 5,760,954
DATED : June 2, 1998
INVENTOR(S) : Koji Tatsuki et al

It is certified that error appears in the above-identified patent and that said Letters Patent is hereby corrected as shown below:

Example 1
A coating solution for forming a reflective layer having the following composition was applied to one side of a polyester film having a thickness of 100μm (LUMIRROR E-20: Toray Industries Inc.) using a bar coater and dried. The glossiness of the reflective layer was found to be 90%.

Signed and Sealed this

Twenty-sixth Day of June, 2001

Attest:

Attesting Officer

NICHOLAS P. GODICI
Acting Director of the United States Patent and Trademark Office

UNITED STATES PATENT AND TRADEMARK OFFICE
CERTIFICATE OF CORRECTION

PATENT NO. : 5,760,954
DATED : June 2, 1998
INVENTOR(S) : Koji Tatsuki et al

It is certified that error appears in the above-identified patent and that said Letters Patent is hereby corrected as shown below:

Column 4,
Line 35, insert the following:

Layer 3 is adjacent to the reflective layer 2. Here, the polarizing film 4 may be a colored film. The reflective type screen may be also produced by preparing a reflective layer 2 comprising aluminum paste on a substrate 1 of synthetic resin by coating and drying, and applying a colored chemical matte layer or light diffusion layer 5 onto the reflective layer 2 by coating and drying.

EXAMPLES

The present invention will be further explained by working examples. In The examples "glossiness' was measured according to JIS-K-7105, specifically by projecting a light from a standard light source onto a surface of the speciemen at an incident angle of 60 degree and measuring the amount of regularly reflected light with a light receiving device.

Example 1

A coating solution for forming a reflective layer having the Following composition was applied to one side of a polyester film having a thickness of 100 $\mu m$ (LUMIRROR E-20: Toray Industries Inc.) using a bar coater and dried. The glossiness of the reflective layer was found to be 90%.

Signed and Sealed this

Fourth Day of December, 2001

Attest:

NICHOLAS P. GODICI
Attesting Officer   Acting Director of the United States Patent and Trademark Office